(12) United States Patent
Yehuda et al.

(10) Patent No.: US 7,885,943 B1
(45) Date of Patent: Feb. 8, 2011

(54) IT COMPLIANCE RULES

(75) Inventors: Hanna Yehuda, Newton, MA (US);
Daniel C. Lanzi, Wilton, CT (US);
Oran Epelbaum, Tel Aviv (IL); Frank Murphy, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 493 days.

(21) Appl. No.: 11/866,133

(22) Filed: Oct. 2, 2007

(51) Int. Cl.
*G06F 17/30* (2006.01)

(52) U.S. Cl. .................. 707/694; 707/665; 707/754; 707/713

(58) Field of Classification Search .............. 707/1, 707/2, 3, 10, 104.1; 726/1
See application file for complete search history.

(56) References Cited

U.S. PATENT DOCUMENTS

| | | | |
|---|---|---|---|
| 7,263,517 B2 | 8/2007 | Sheu et al. | |
| 7,536,456 B2 * | 5/2009 | Williams et al. | 709/224 |
| 7,603,358 B1 * | 10/2009 | Anderson et al. | 707/10 |
| 2005/0228685 A1 * | 10/2005 | Schuster et al. | 705/1 |
| 2006/0161879 A1 * | 7/2006 | Lubrecht et al. | 717/101 |
| 2006/0195425 A1 | 8/2006 | Deem et al. | |
| 2007/0198480 A1 | 8/2007 | Hogue et al. | |
| 2008/0148346 A1 * | 6/2008 | Gill et al. | 726/1 |
| 2008/0222631 A1 * | 9/2008 | Bhatia et al. | 717/178 |
| 2008/0271110 A1 * | 10/2008 | Graves et al. | 726/1 |
| 2009/0077621 A1 * | 3/2009 | Lang et al. | 726/1 |

* cited by examiner

*Primary Examiner*—Tim T. Vo
*Assistant Examiner*—Dangelino N Gortayo
(74) *Attorney, Agent, or Firm*—Krishnendu Gupta; Gerald P. Kazanjian

(57) ABSTRACT

Compliance rules are created that can be used to help detect violations of compliance policies imposed on an IT infrastructure. Each of one or more compliance rules associated with a respective IT-infrastructure compliance policy is defined by specifying three items: 1) the type of configuration items to which the rule is to be applied, 2) the rule scope that determines which configuration items of the configuration type are to be checked for compliance, and 3) a desired state that each configuration item checked must satisfy in order to be considered in compliance.

17 Claims, 17 Drawing Sheets

Policies

| Policy Name | Owner | Last Modified (GMT+01:00) ▼ | # of Rules | # of Violations |
|---|---|---|---|---|
| MS Windows Server 2003 Security | Compliancy Officer | 2007-05-22 05:45 | 01 | 0 |
| ISO 9001 project due 11/24/2007 | Policy Officer | 2007-05-19 19:30 | 12 | 12 |
| Network Redundancy | NY-Policy Officer | 2007-04-01 20:00 | 10 | 22 |
| Network Security | Policy Officer | 2007-04-01 07:05 | 45 | 10 |
| Server Security | Policy Officer | 2007-03-09 10:30 | 15 | 05 |
| Licensing | Policy Officer | 2007-03-08 19:30 | 14 | 12 |
| Server hardware minimum requirements | Policy Officer | 2007-03-06 10:05 | 22 | 23 |
| Application Integrity - ERP apps | Policy Officer | 2007-02-19 19:30 | 13 | 04 |
| Application Integrity - CRM apps | Policy Officer | 2007-02-11 01:00 | 09 | 09 |
| Patch Level in DMZ | Policy Officer | 2007-02-10 09:00 | 05 | 07 |
| California Health Care - HIPAA | Policy Officer | 2007-02-09 19:30 | 10 | 19 |
| QTC App Performance - Oregon | Policy Officer | 2007-02-05 02:00 | 16 | 29 |

[Create Policy] [View] [Delete] [Save As] [Activate] [Deactivate] [Save as Template]    [Evaluate All Policies]

```
        // Define scope constraints (only one in this case)
1402 {  scope_constraint  = (host.operating_system.family = "Windows")        1404

// Define compliance conditions (only one in this case)
        // The attribute access expression in the condition is stored in a
        // variable for easy subsequent reuse in this script
        checked_attrib_1 = host.disk[label="c"].capacity        1408
1406 {  condition1       = (checked_attrib_1 > 100)
        all_conditions   = condition1        // can add "and condition2" etc. here // Form the entire rule query
1410 {  query = scope_constraint & !all_conditions;

// Specify what to get when running the query: always get the host
        // ID, and also for every condition, get "null" if it was not
        // violated, and the actual value if it was.
1412 {  query.addWantedDetail("id", id)
        query.addWantedDetail("detail1", condition1 ? null : checked_attrib_1)
```

FIG. 14

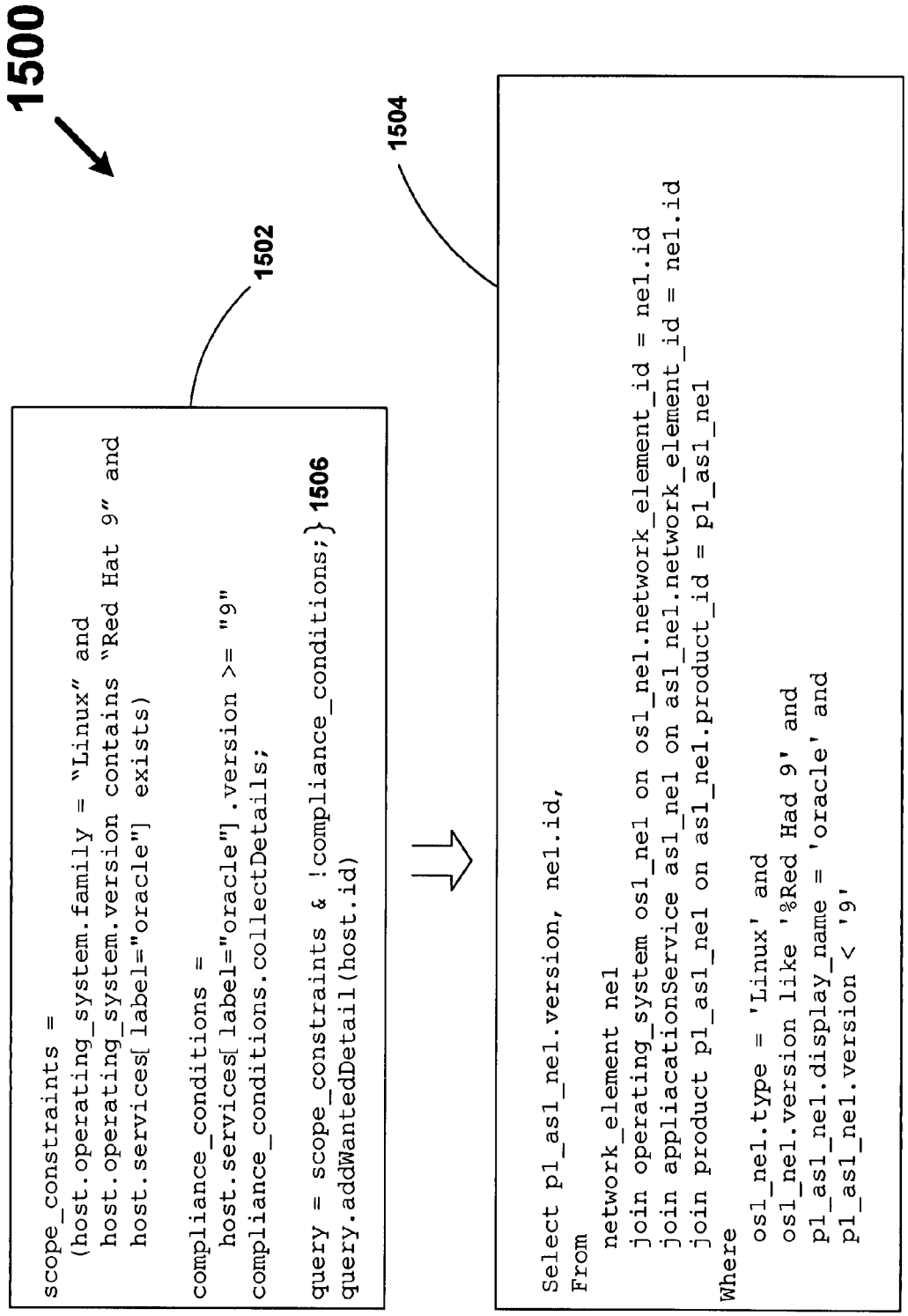

1700

1710

RECEIVE INPUT DEFINING A COMPLIANCE RULE, THE INPUT INCLUDING:
  I) INPUT IDENTIFYING A CONFIGURATION-ITEM TYPE, THE IDENTIFIED CONFIGURATION-ITEM TYPE DETERMINING A TYPE OF CONFIGURATION ITEM IN AN IT INFRASTRUCTURE OF DIFFERENT TYPES OF CONFIGURATION ITEMS; AND
  II) INPUT DEFINING A SCOPE OF THE COMPLIANCE RULE, THE SCOPE DETERMINING WHICH CONFIGURATION ITEMS OF THE IDENTIFIED TYPE ARE TO BE CHECKED BY THE COMPLIANCE RULE FOR COMPLIANCE;
  III) INPUT DEFINING A DESIRED STATE FOR EACH OF THE CONFIGURATION ITEMS TO BE CHECKED BY THE COMPLIANCE RULE, THE DESIRED STATE INCLUDING AT LEAST ONE COMPLIANCE CONDITION THAT MUST BE SATISFIED FOR A CHECKED CONFIGURATION ITEM TO BE IN COMPLIANCE

1720

ACCUMULATE QUERY FRAGMENTS ASSOCIATED WITH THE SCOPE OF THE COMPLIANCE RULE

1730

ACCUMULATE QUERY FRAGMENTS ASSOCIATED WITH THE DESIRED STATE

1740

MERGE THE ACCUMULATED QUERY FRAGMENTS INTO A QUERY FOR APPLYING THE COMPLIANCE RULE TO DATA CORRESPONDING TO THE IT INFRASTRUCTURE

*FIG. 17*

IT COMPLIANCE RULES

FIELD OF THE INVENTION

The present disclosure relates generally to analyzing configuration information related an information technology ("IT") infrastructure. For example, embodiments of inventive matter disclosed herein can be advantageously used in helping a user detect violations of compliance policies imposed on the IT infrastructure.

BACKGROUND OF THE INVENTION

Conventional systems performing compliance analysis on data in a configuration-management database ("CMDB") enable a respective user to create a rule and perform certain functions such as compliancy checks. For example, conventional compliance-analysis systems can be used to ensure that a resource such as a client computer is compliant with a data security regulatory rule. If the client computer is not compliant, the conventional compliance-analysis system can provide notification to a network administrator regarding the violation.

Conventional compliance-analysis systems commonly provide an application programming interface ("API") that enables a user to query a configuration-management database ("CMDB") to help the user detect violations of compliance policies. Typically, the user queries the CMDB using a query language such as Structured Query Language ("SQL").

SUMMARY OF THE INVENTION

Conventional compliance-analysis systems, such as those discussed above, suffer from a number of deficiencies. For example, although conventional compliance-analysis systems may provide tools that can be used to manage a set of rules and test for compliancy as mentioned above, use of conventional compliance-analysis systems can be quite tedious and time-consuming, especially when used to manage an IT infrastructure including large groups of resources.

Additionally, conventional compliance-analysis systems provide a user with SQL or SQL-like APIs. That is, in conventional compliance-analysis systems, users typically implement compliancy rules using SQL queries that are constructed by the users of the conventional compliance-analysis system. SQL queries can be difficult for users to work with for at least two reasons. First, because of the verbosity of SQL, SQL queries tend to be long and SQL queries tend to contain a significant amount of programming boilerplate that can be distracting and unfriendly to users. For example, SQL keywords, such as "SELECT" and "FROM," can appear in every query. Second, SQL queries are non-sequential. An SQL query includes different clauses: "SELECT," "FROM," "WHERE," etc. As an SQL query is constructed, each logical addition to the query may manifest in a plurality of the clauses. Thus, the construction of a SQL query does not have a sequential flow and the query is not read in the same order that it is written.

Inventive matter disclosed herein deviates with respect to and improves upon conventional technology, such as discussed above, and other technology also known in the prior art. Embodiments of inventive matter disclosed herein enable users to easily and intuitively create compliance policies against a CMDB without having to use complex SQL-like APIs. Users are provided with a High-Level Query API into a CMDB that is not only general and powerful, the query interface also enables users to easily read, understand, and author queries into the CMDB.

Developers of compliance-analysis systems in accordance with embodiments disclosed herein do not necessarily need to replace conventional SQL-like APIs with the High-Level Query APIs disclosed herein. Thus, in particular embodiments, High-Level Query APIs as disclosed herein may operate on top of a conventional SQL-like API. That is, a user may interface with a High-Level Query API as disclosed herein and the High-Level Query API can interface with a conventional SQL-like API. In other embodiments, the High-Level Query API may interface directly with the CMDB.

In particular embodiments, a compliance manager executing on a computer system has access to a repository of collected data. The collected data may be obtained as a result of direct or indirect queries to resources in a respective IT infrastructure. The collected data may also be obtained as a result of monitoring message information transmitted between resources in the IT infrastructure.

Based on input from a user, the compliance manager enables creation of policies and compliance rules to test compliance of IT infrastructure resources via evaluation of the corresponding collected data. Each of one or more compliance rules associated with a respective IT-infrastructure compliance policy is defined by specifying three items: 1) the type of configuration items to which the rule is to be applied, 2) the rule scope that determines which configuration items of the configuration type are to be checked for compliance, and 3) a desired state that each configuration item checked must satisfy in order to be considered in compliance.

In embodiments disclosed herein, a compliance manager accumulates query fragments associated with the rule scope. The compliance manager also accumulates query fragments associated with the desired state of a rule. The compliance manager merges the accumulated query fragments into a query for applying the compliance rule to data corresponding to the network being checked for compliance.

BRIEF DESCRIPTION OF THE DRAWINGS

Objects, features, and advantages of inventive matter disclosed herein may be better understood by referring to the following description in conjunction with the accompanying drawings, in which like numerals indicate like structural elements and features in the various figures. The drawings are not meant to limit the scope of the invention. For clarity, not every element may be labeled in every figure. The drawings are not necessarily to scale, emphasis instead being placed upon illustrating the principles of the invention.

FIG. 2 is a screenshot illustrating an example graphical user interface presenting a list of compliance policies and enabling a selection of policy-related options in accordance with embodiments disclosed herein.

FIG. 9 is a screenshot illustrating an example graphical user interface enabling creation of a rule scope definition in accordance with embodiments disclosed herein.

FIG. 11 is a screenshot illustrating an example graphical user interface enabling creation of a desired state definition in accordance with embodiments disclosed herein.

FIG. 12 is a screenshot illustrating an example graphical user interface enabling creation of a desired state definition in accordance with embodiments disclosed herein.

FIG. 13 is a screenshot illustrating an example graphical user interface enabling creation of a desired state definition in accordance with embodiments disclosed herein.

FIG. 14 illustrates an example script for evaluating a compliance rule in accordance with embodiments disclosed herein.

FIG. 15 illustrates an example script translated into SQL text in accordance with embodiments disclosed herein.

FIG. 17 illustrates procedures performable by a compliance manager in accordance with embodiments disclosed herein.

DETAILED DESCRIPTION OF THE INVENTION

Inventive matter disclosed herein provides for compliance rules for checking compliance of an IT infrastructure. In particular embodiments of the inventive matter disclosed herein, an administrator for an IT infrastructure can interact with a compliance manager application to more easily create compliance rules and make the compliance rules part of a policy to which a particular IT infrastructure may be expected to comply. The compliance manager can execute the compliance rules to determine whether the IT infrastructure is in compliance with the policy.

Figure 1:
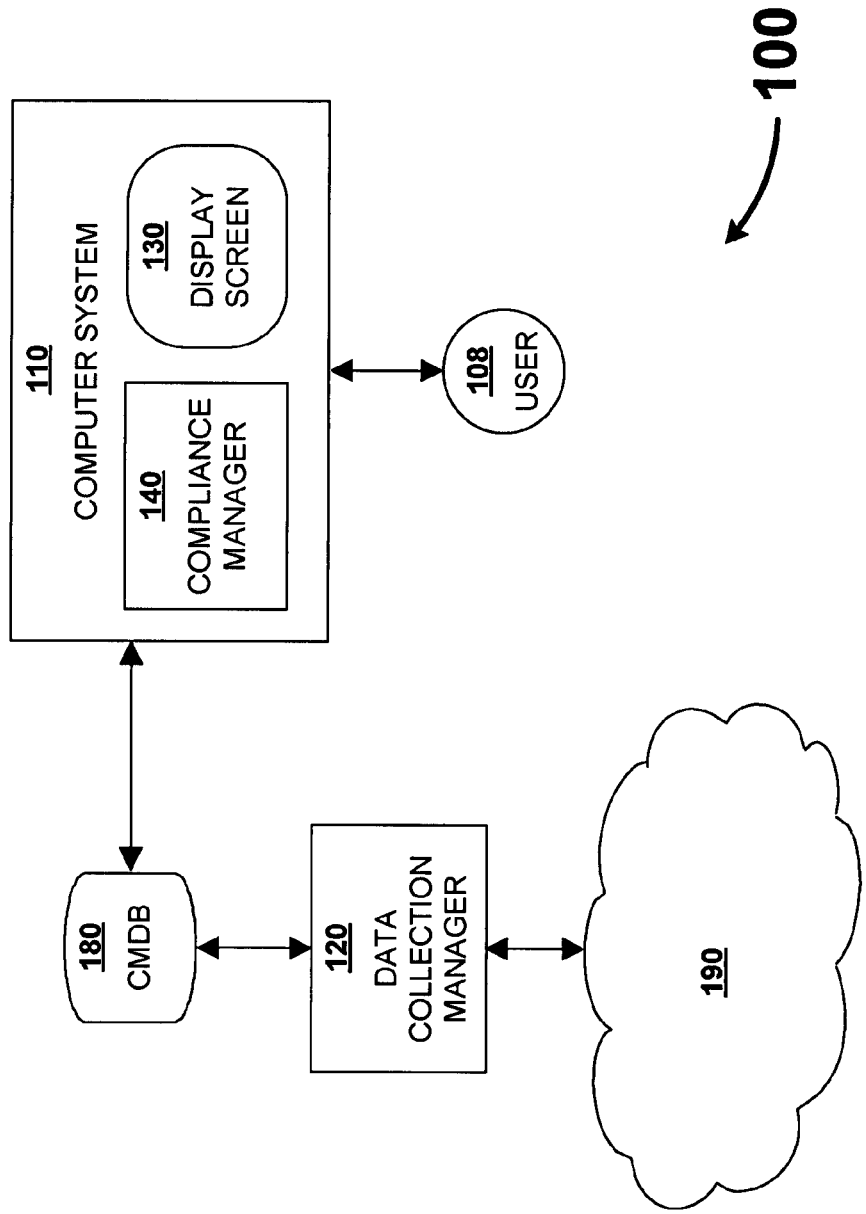
FIG. 1 is a diagram illustrating an example collection of resource data and use of a compliance manager according to embodiments disclosed herein.

FIG. 1 is a diagram illustrating an example collection of resource data and use of a compliance manager 140 according to embodiments disclosed herein. As shown, communication environment 100 includes an IT infrastructure 190, a data collection manager 120, a configuration-management database ("CMDB") 180, a computer system 110, a display screen 130, a compliance manager 140, and a user 108.

The data collection manager 120 collects data (e.g., resource information) from resources, services, processes, applications, etc. operating and/or present in the IT infrastructure 190. IT infrastructure 190 can include one or more networks of sub-resources having data collected by data collection manager 120.

Data collection manager 120 can be configured to collect information in many different ways. For example, data collection manager 120 can initiate direct queries to resources in the respective IT infrastructure 190. Queries can include requests for configuration data associated with a queried resource. Responses to queries can include data such as version information associated with a particular application, vendor information, etc. associated with a queried resource. Data collection manager 120 then stores the received information in the CMDB 180 for application of compliance policies and corresponding rules. In particular embodiments, the received information is stored in the CMDB 180 in accordance with one or more object models.

Note that the data collection manager 120 can also retrieve information from resources based on indirect queries. For example, the data collection manager 120 can communicate with software agents that collect resource data on behalf of the data collection manager 120.

In addition to direct and indirect queries, the data collection manager 120 can also monitor connections or connectivity by monitoring message information transmitted between the resources present in the IT infrastructure 190. For example, the data collection manager 120 can be configured to analyze the message data transmitted in the IT infrastructure 190 and store appropriate information about different monitored connections in the CMDB 180.

Based on analyzing the message data, the data collection manager 120 can identify different types of information such as a protocol used to support communications between applications, whether two or more applications communicate via encrypting data, types of information exchanged between the two or more, which applications communicate with each other, etc. The compliance manager 140 can apply rules to identify whether certain applications are allowed to communicate with each other or whether the applications communicate with each other using a proper protocol as specified by a rule.

In particular embodiments, the data collection manager 120 analyzes the collected data and stores the information as objects in the CMDB 180 in accordance with one or more object models. Each object in the CMDB 180 includes information associated with a respective resource in the IT infrastructure 190. Each object in the CMDB 180 may be referred to herein as a configuration item. Storage of the collected information (and/or other derived information) can include classifying the information in one of three classes such as whether the resource information is associated with a host resource, a connection, or a service in the IT infrastructure 190. Although this classification is sufficient in particular embodiments to store information for an IT infrastructure, such as an IT infrastructure for a storage area network, this classification can be extended to any number of classes, subclasses, etc.

In an example embodiment, the IT infrastructure 190 can include resources such as clients, servers, switches, storage devices, host resource, connections supporting communications between computer systems, services, etc. in IT infrastructure 190. A resource such as a client resource (e.g., a computer system) can be classified as a host resource. The computer system can support a number of applications such as operating systems, text editor applications, e-mail applications, etc. Upon collection of data associated with the sub-resources (e.g., operating system, text editors applications, etc.), the data collection manager 120 stores the information in objects. Each object (e.g., representing a resource or sub-resource) in the CMDB 180 includes information about the resource such as software version information, vendor information, computer system on which the application operates, etc.

In particular embodiments, the data collection manager 120 stores the information in the CMDB 180 as a set of objects with associated attributes. Pointers associated with the objects indicate how the objects are related to each other.

In particular embodiments, the compliance manager 140, via a graphical user interface on the display screen 130, enables a respective user to create compliance policies and the compliance rules underlying the policies. In this manner, the compliance manager may receive input defining a compliance rule, wherein the input includes: 1) input identifying a configuration-item type, 2) input defining a scope of the compliance rule, and 3) input defining a desired state for each of the configuration items to be checked by the compliance rule.

A configuration item can be any object in the CMDB 180. The configuration-item type determines the type of configuration item to which the compliance rule applies. In particular embodiments, the identified configuration-item type will be one of three types: hosts, services, or connections.

The scope of the compliance rule determines which configuration items of the identified type are to be checked by the rule for compliance. The default rule scope is to apply the rule to all the configuration items of the identified configuration-item type. Typically, the compliance manager 140 receives input that narrows the scope of the compliance rule to some subset of the configuration items of the identified type. For example, in particular embodiments, the rule scope includes at least one conditional expression. The configuration items of the identified type that satisfy all conditional expressions are considered within the rule scope. However, if the received input does not narrow the rule scope, then the rule scope is to apply the compliance rule to all configuration items of the identified type.

During application of the compliance rule, each of the configuration items that falls within the rule scope will be checked by the compliance rule to see if the configuration item satisfies the defined desired state. The desired state includes at least one compliance condition that must be satisfied for a checked configuration item to be in compliance.

The compliance rules of a policy can be applied to the data in the CMDB 180 to check whether the IT infrastructure 190 is in compliance with the policy. The compliance manager applies a compliance rule to the data by first creating a query corresponding to the compliance rule and then executing the query to apply the compliance rule to the data corresponding to the IT infrastructure 190 (e.g., the data in the CMDB 180) to determine compliance of the IT infrastructure 190.

To create the query corresponding to a compliance rule, the compliance manager 140 accumulates query fragments associated with the rule scope, accumulates query fragments associated with the desired state, and merges the accumulated query fragments into a query corresponding to the compliance rule.

FIG. 2 is a screenshot 200 of an example graphical user interface as generated by the compliance manager 140 for display on the display screen 130 in accordance with embodiments disclosed herein. The screenshot 200 presents a list of compliance policies and enables a selection of policy-related options 204 in accordance. For example, a policy 202 entitled "MS Windows Server 2003 Security" is highlighted and the user 108 is presented with options 204 related to this policy 202. The screenshot 200 also presents the user 108 with the option 206 of creating a new policy.

Figure 3:
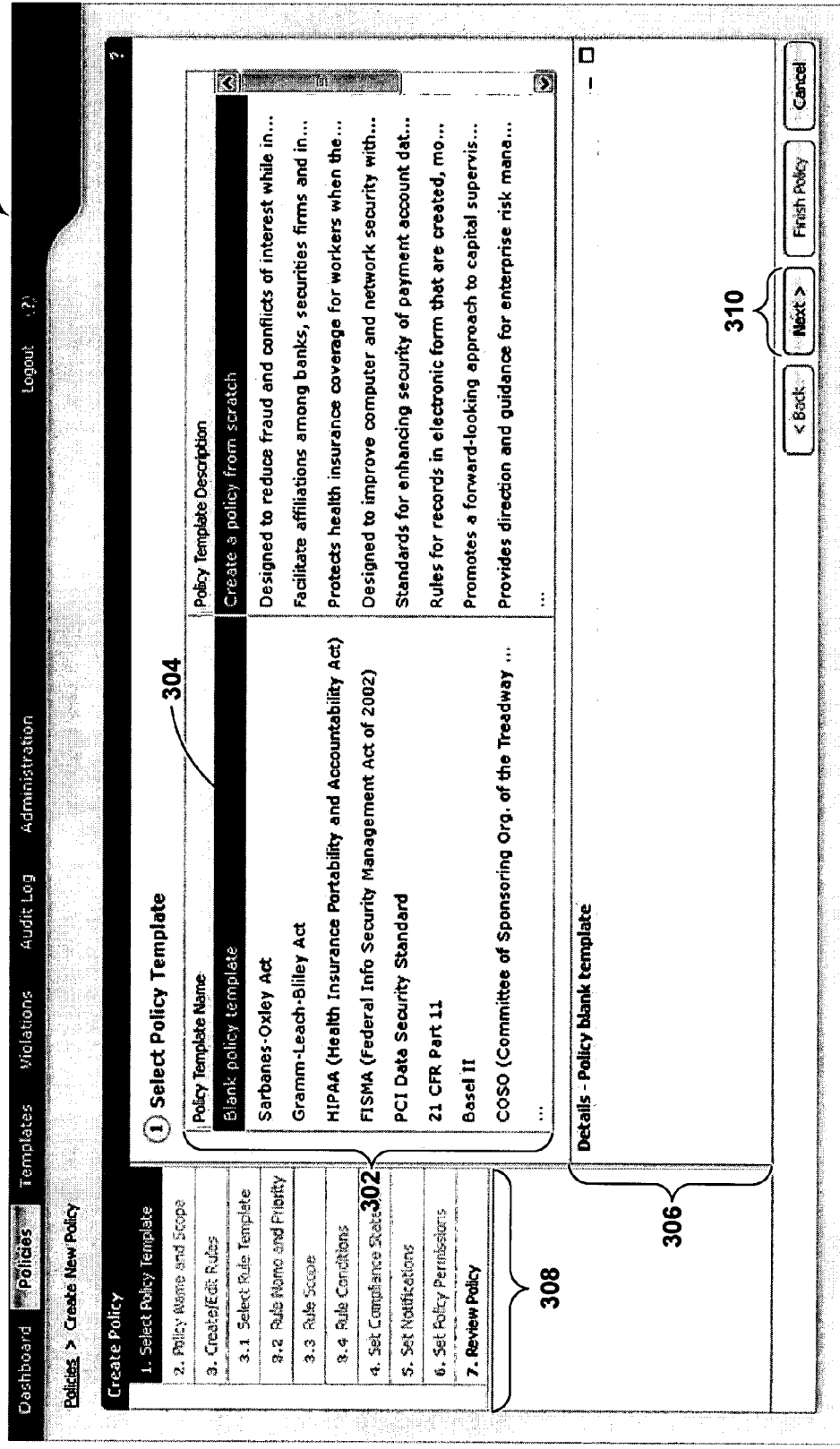
FIG. 3 is a screenshot illustrating an example graphical user interface enabling selection of different compliance-policy templates in accordance with embodiments disclosed herein.

FIG. 3 is a screenshot 300 illustrating an example graphical user interface enabling selection of different compliance-policy templates in accordance with embodiments disclosed herein. The compliance manager 140 can display the "Select Policy Template" screenshot 300 as a result of receiving input indicating that the user 108 has selected the "Create Policy" option 206 displayed on the screenshot 200 of FIG. 2. The "Select Policy Template" step is the first step in creating a compliance policy. The compliance manager 140 highlights the current step (i.e., "Select Policy Template" in screenshot 300) in the menu 308, providing the user 108 with an indication of the current step. The user 108 may select a compliance-policy template from compliance-policy templates displayed in the template selection menu 302. For example, in the "Select Policy Template" screenshot 300, the user 108 has selected the "Blank policy template" 304. The compliance manager 140 displays a description of the details of a selected policy template in the "Details" viewing region 306. Upon receiving input indicating that the user 108 has selected the "Next >" option 310, the compliance manager 140 can display the screenshot 400 as shown in FIG. 4.

Figure 4:
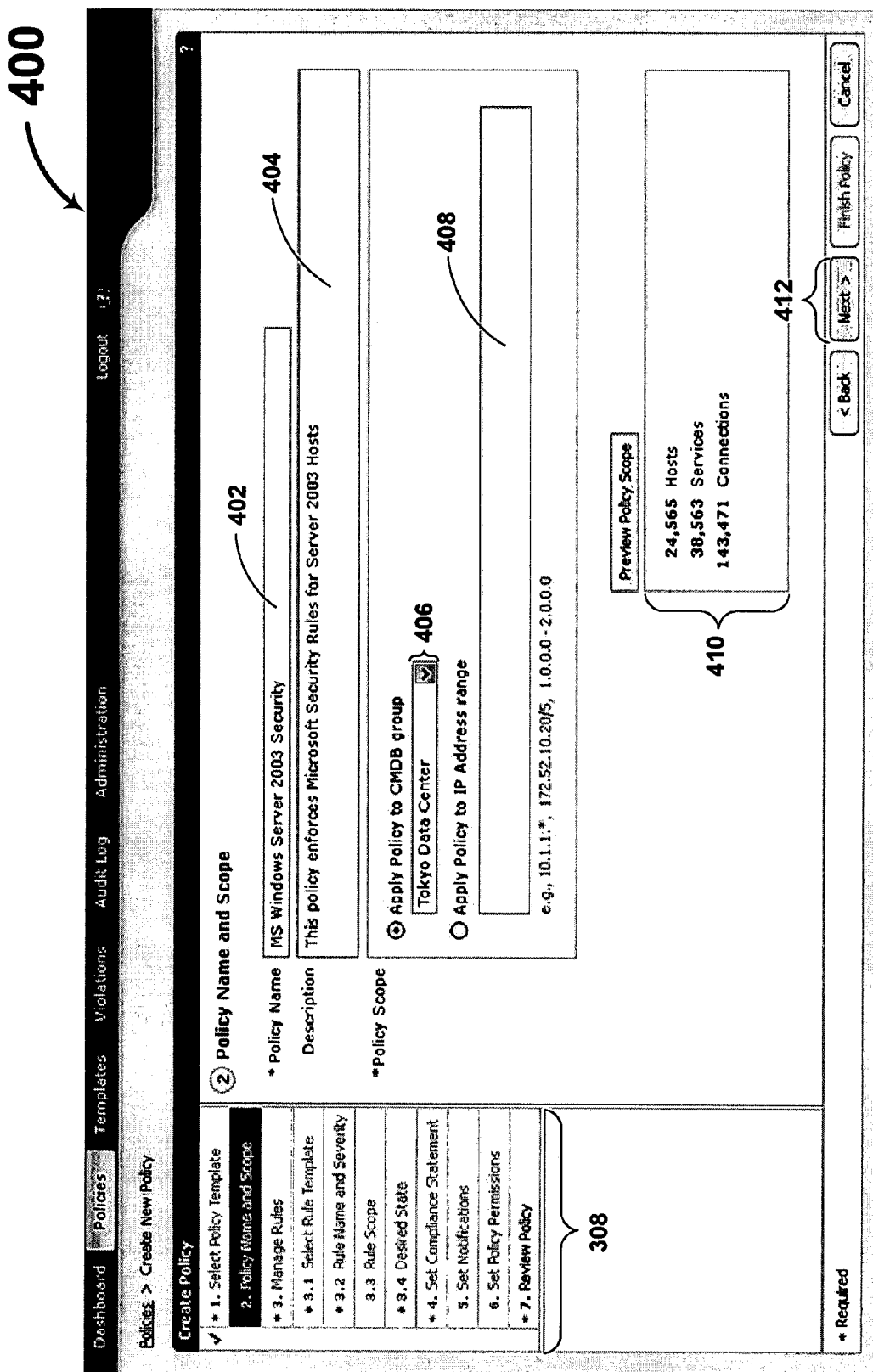
FIG. 4 is a screenshot illustrating an example graphical user interface enabling the naming of a compliance policy and enabling the selection of a corresponding compliance-policy scope in accordance with embodiments disclosed herein.

FIG. 4 is a screenshot 400 illustrating an example graphical user interface enabling the naming of a compliance policy and enabling the selection of a corresponding compliance-policy scope in accordance with embodiments disclosed herein. For example, the user 108 can enter the name of a new policy in the "Policy Name" field 402. The user 108 can also enter a description of the new policy in the "Description" field 404. The user can identify a scope of resources in the IT infrastructure 190 to which the compliance policy applies by either choosing a group of resources from a drop-down menu 406 or by entering a range of IP addresses into a field 408.

Once the compliance manager 140 receives input identifying a scope of the compliance policy, the compliance manager 140 may display information about the policy scope in the "Preview Policy Scope" region 410. Upon receiving input indicating that the user 108 has selected the "Next >" option 412, the compliance manager 140 can display the screenshot 500 as shown in FIG. 5.

Figure 5:
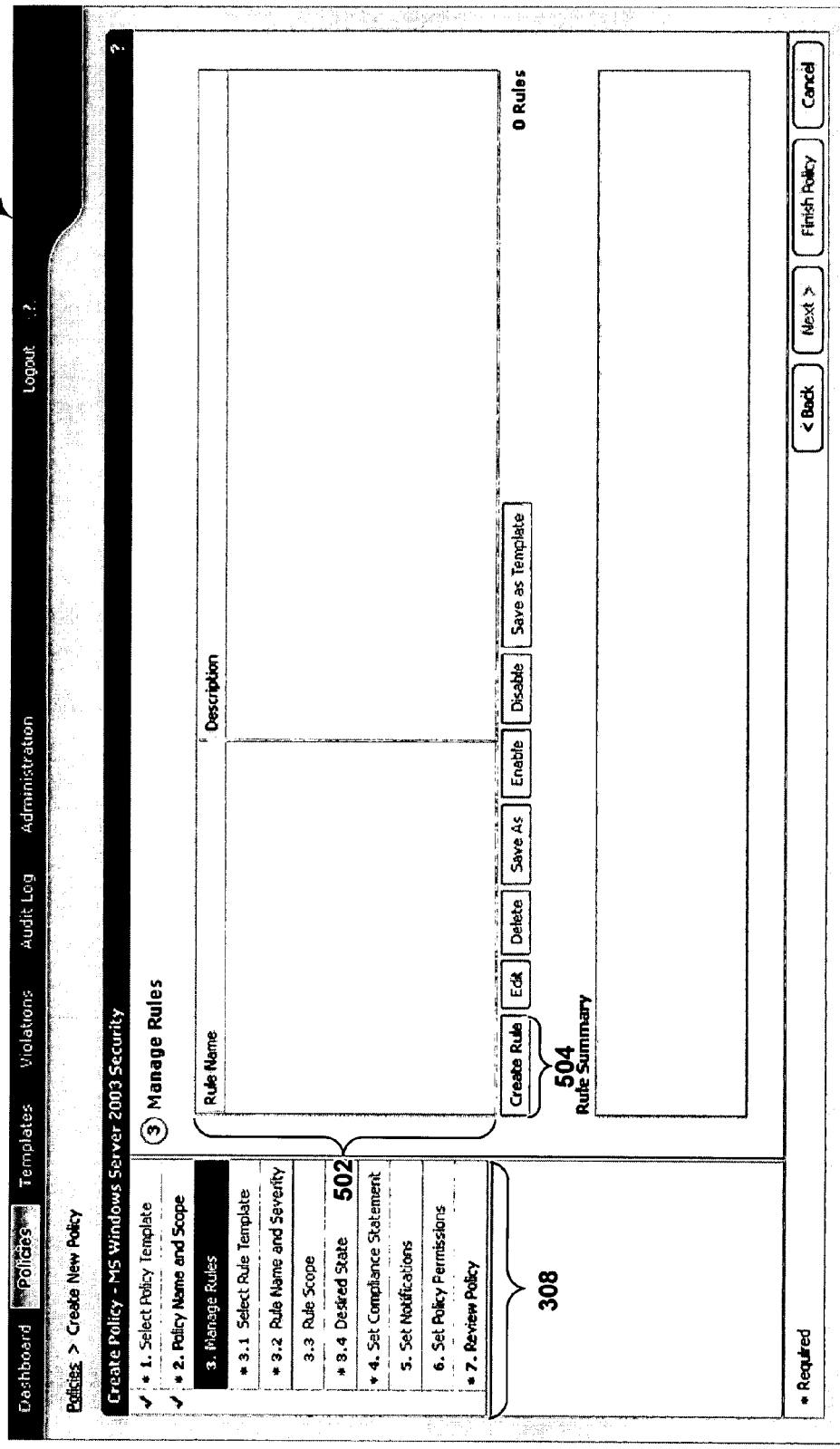
FIG. 5 is a screenshot illustrating an example graphical user interface enabling management of compliance rules associated with a compliance policy, in accordance with embodiments disclosed herein.

FIG. 5 is a screenshot 500 illustrating an example graphical user interface enabling management of compliance rules associated with a compliance policy, in accordance with embodiments disclosed herein. The step "Manage Rules" is highlighted in the menu 308 displayed by the screenshot 500. The compliance manager 140 displays any existing rules for the current compliance policy in the rules menu 502. As shown in screenshot 500, the compliance manager 140 has not displayed any rules in the rules menu 502 as the "MS Windows Server 2003 Security" policy is a newly created policy and does not yet have any rules associated with it.

To create a compliance rule for the currently-displayed compliance policy, the user 108 can select the "Create Rule" option 504. In response to such a selection, the compliance manager 140 can display the screenshot 600 as shown in FIG. 6.

Figure 6:
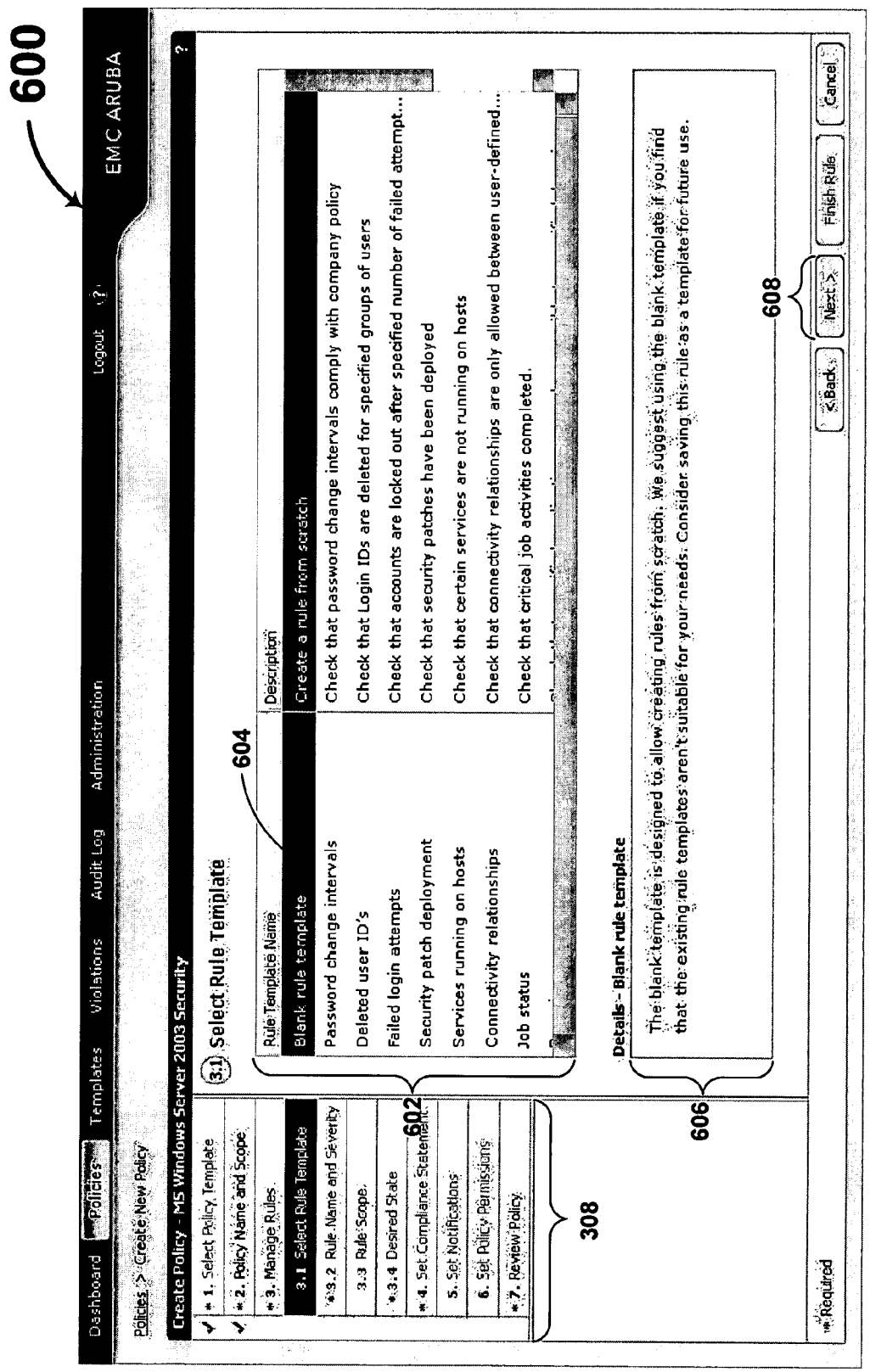
FIG. 6 is a screenshot illustrating an example graphical user interface enabling selection of a rule template in accordance with embodiments disclosed herein.

FIG. 6 is a screenshot 600 illustrating an example graphical user interface enabling selection of a rule template in accordance with embodiments disclosed herein. The mechanics of selecting a rule template can be similar to the selection of a policy template. The compliance manager 140 displays the current step in the menu 308. The user 108 may select a rule template from rule templates displayed in the rule-template selection menu 602. For example, in the "Select Rule Template" screenshot 600, the user 108 has selected the "Blank rule template" 604. The compliance manager 140 displays a description of the details of a selected rule template in the "Details" viewing region 606. Upon receiving input indicating that the user 108 has selected the "Next >" option 608, the compliance manager 140 can display the screenshot 700 as shown in FIG. 7.

Figure 7:
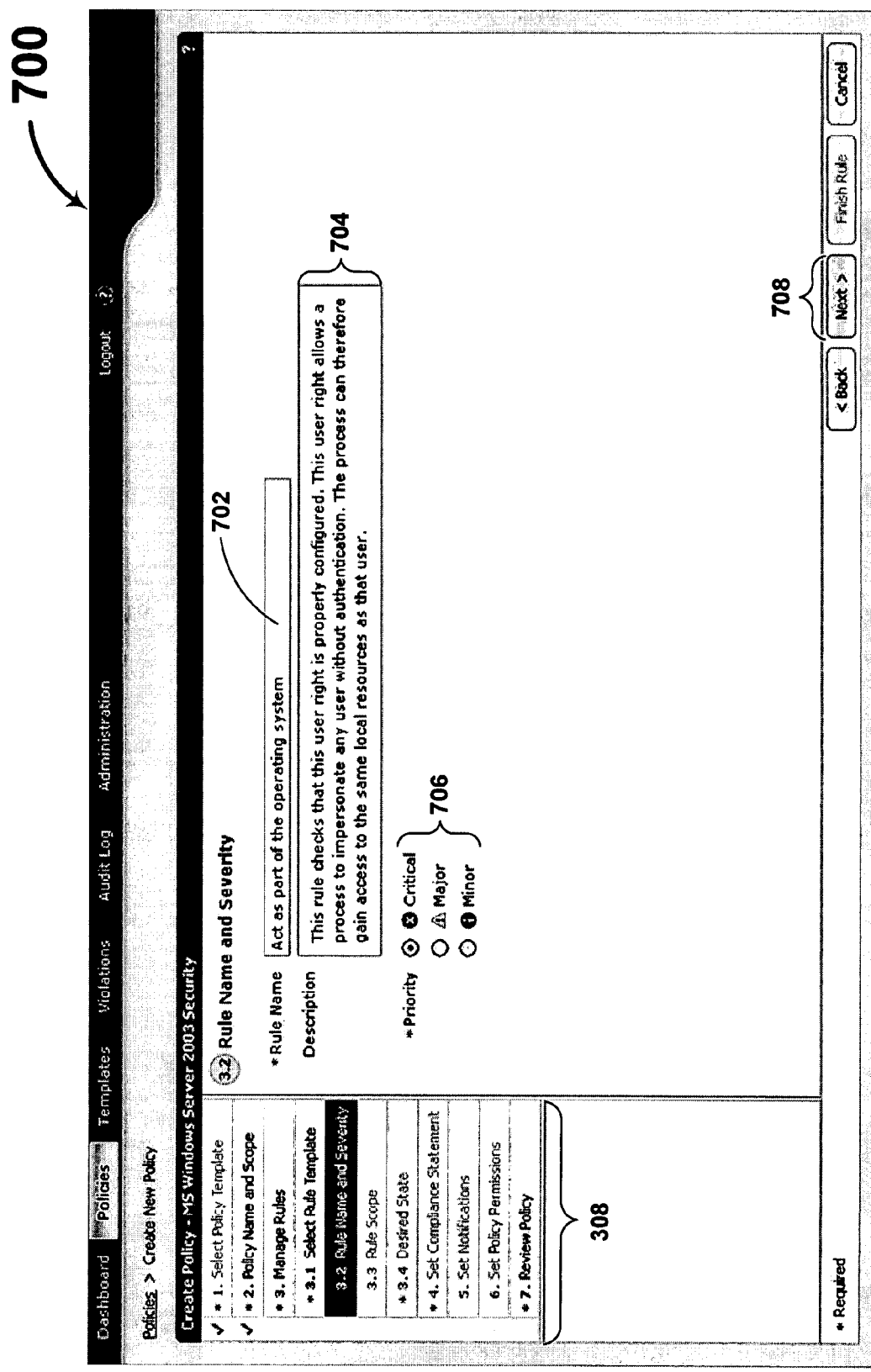
FIG. 7 is a screenshot illustrating an example graphical user interface enabling assignment of identification and priority information to a compliance rule in accordance with embodiments disclosed herein.

FIG. 7 is a screenshot 700 illustrating an example graphical user interface enabling rule naming and assignment of priority information to a compliance rule in accordance with embodiments disclosed herein. The "Rule Name and Severity" step is highlighted in the menu 308. The user 108 can name the currently-created rule via input with respect to display field 702. In addition to naming the compliance rule, the user 108 can supply a description for the currently-created rule via input with respect to display field 704. Display region 706 enables the user 108 to select a priority or importance level associated with the currently-created rule. For example, the user 108 has associated the currently-created rule with a highest priority level of "Critical" as shown in screenshot 700. Upon receiving input indicating that the user 108 has selected the "Next >" option 708, the compliance manager 140 can display the screenshot 800 as shown in FIG. 8.

Figure 8:
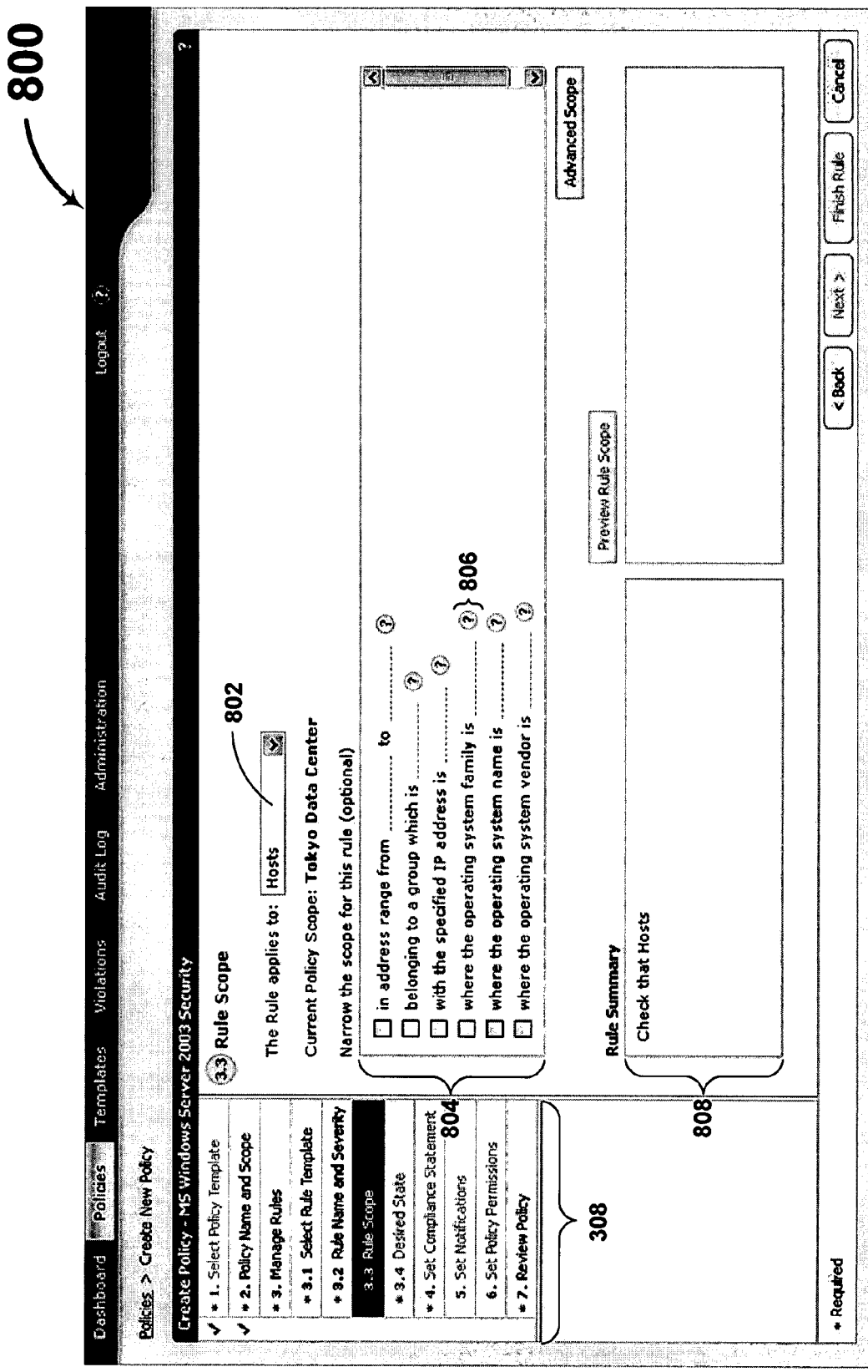
FIG. 8 is a screenshot illustrating an example graphical user interface enabling creation of a rule scope definition in accordance with embodiments disclosed herein.

FIG. 8 is a screenshot 800 illustrating an example graphical user interface enabling creation of a rule scope definition in accordance with embodiments disclosed herein. In screenshot 800, the compliance manager 140 has highlighted the "Rule Scope" step in the menu 308. The compliance manager 140 displays a summary of the compliance rule being created in the "Rule Summary" region 808.

The compliance manager 140 displays a pull-down menu 802 enabling the user 108 to select a configuration-item type from the menu 802. In this manner, the user's 108 input identifies the configuration-item type selected by the user 108. In particular embodiments, the configuration-item type is either hosts, services, or connections. As disclosed herein, the configuration-item type corresponds to a type or category of resources in the IT infrastructure 190. For example, a configuration-item type of hosts corresponds to host resources in the IT infrastructure 190, a configuration-item type of services corresponds to service resources providing a respective service function in the IT infrastructure 190, and a configuration-item type of connections corresponds to connection resources between two or more resources communicating with each other in the IT infrastructure 190. As shown in screenshot 800, the user 108 has selected a configuration-item type of hosts.

In addition to enabling selection of a configuration-item type via menu 802, the compliance manager 140 provides a scope menu 804, enabling the user 108 to define a scope for the currently-displayed compliance rule. The rule scope determines which configuration items of the identified type are to be checked by the compliance rule for compliance. Once the user 108 selects a configuration-item type, the compliance manager 140 may update the scope menu 804 so that the scope menu 804 presents the user 108 with a selection of scope attributes pertaining to the selected configuration-item type. Each scope attribute, when selected by the user 108, narrows the scope of the rule. Dynamically displaying a list of relevant attributes in the scope menu 804 depending on selection of the configuration-item type helps the user 108 to create a respective rule more quickly because the user 108 can select from a listing rather that create attributes from scratch. Additionally, the compliance manager 140 can utilize the object model to present a selection of scope attributes that is appropriate for the selection configuration-item type. In this manner, the user 108 can not select a scope attribute that is inconsistent with the underlying object model. If the user 108 does not select any of the attributes presented by the scope menu 804, then the compliance rule will apply to all configuration items of the identified configuration-item type.

To facilitate selection of one or more scope attributes, the compliance manager 140 displays a check box associated with each selectable attribute. The user 108 can select a scope attribute by clicking (i.e., with a computer mouse) on the check box associated with the scope attribute to be selected. Similar to the selection of a configuration-item type, the compliance manager 140 can associate each selectable rule scope attribute with a query fragment.

Figure 9:
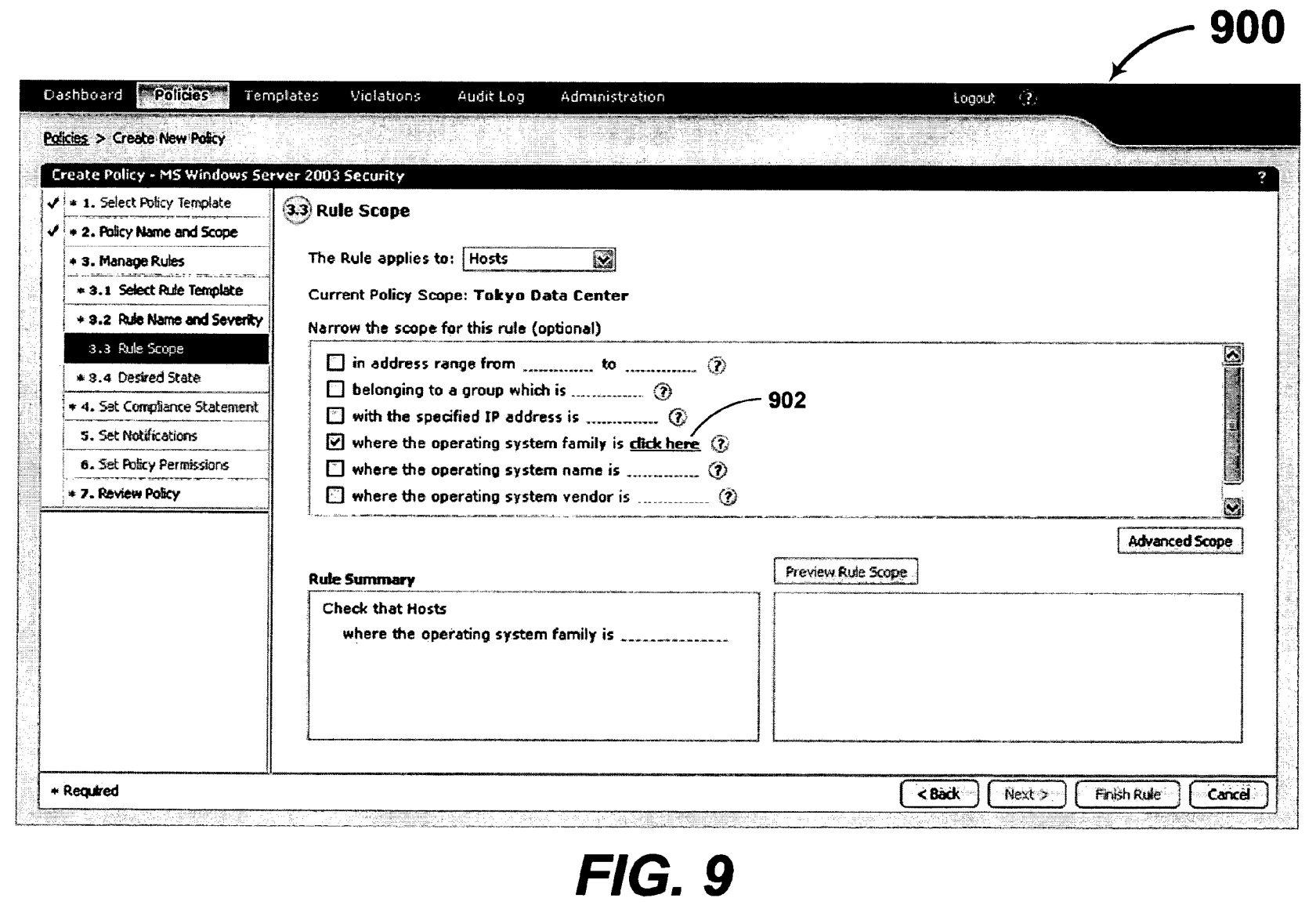

FIG. 9 is a screenshot 900 illustrating an example graphical user interface enabling creation of a rule scope definition in accordance with embodiments disclosed herein. The compliance manager 140 can display the screenshot 900 in response to receiving input that indicates the user 108 has selected a particular scope attribute 806 shown in screenshot 800. That is, screenshot 9 shows that the user 108 has selected a scope attribute narrowing the rule scope to apply to hosts where the operating system on the host is of a particular family. In particular embodiments, the query fragment ".operating_system.family" is associated with the selected rule scope attribute. In particular embodiments, the compliance manager 140 can save this associated query fragment (e.g., the text ".operating_system.family") so that the saved query fragment can be later merged with other saved query fragments to create a query. Alternately, the compliance manager 140 may incrementally build a query by adding this query fragment to one or more previously-saved query fragments. For example, the compliance manager 140 may add the ".operating_system.family" query fragment to the "hosts" query fragment to create the expression "hosts.operating_system.family". By clicking on the "click here" option 902, the user 108 can choose the specific operating system family.

Figure 10:
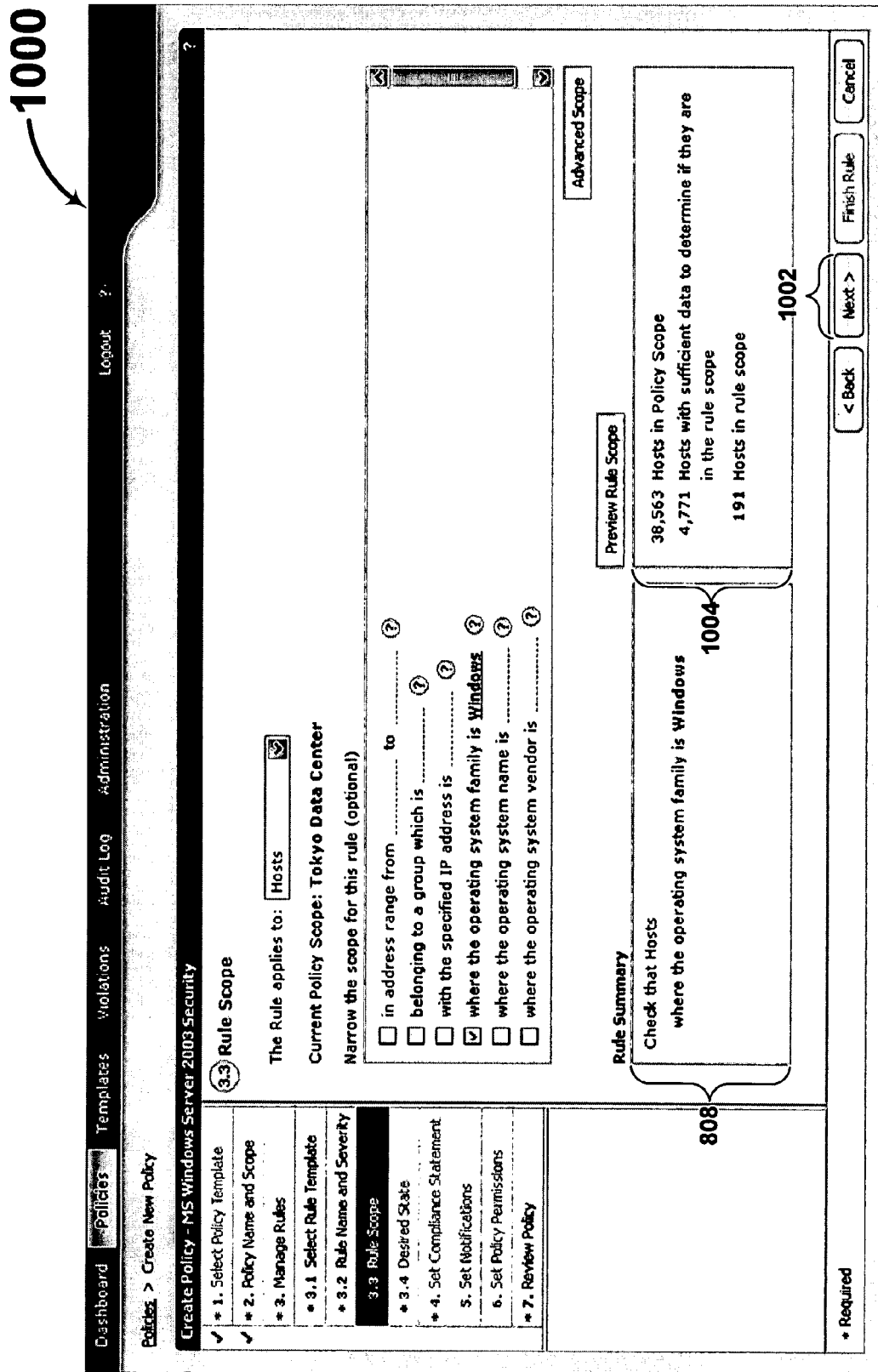
FIG. 10 is a screenshot illustrating an example graphical user interface displaying a rule scope definition in accordance with embodiments disclosed herein.

FIG. 10 is a screenshot 1000 illustrating an example graphical user interface displaying a rule scope definition in accordance with embodiments disclosed herein. The compliance manager 140 can display screenshot 1000 in response to receiving input indicating that the user 108 has specified "Windows" as the particular operating system family for the "click here" option 902 in screenshot 900. The compliance manager 140 displays a summary of the compliance rule in the "Rule Summary" region 808 and displays a preview of the rule scope in the "Preview Rule Scope" region 1004.

After completing a rule scope definition via selection of one or more scope attributes, the user 108 may initiate the defining of a desired state for each of the configuration items to be checked by the compliance rule. The user 108 may initiate the defining of a desired state, for example, by clicking on the "Next >" option 1002 in the screenshot 1000 of FIG. 10. Upon receiving input indicating that the user 108 has selected the "Next >" option 1002, the compliance manager 140 can display the screenshot 1100 as shown in FIG. 11.

Figure 11:
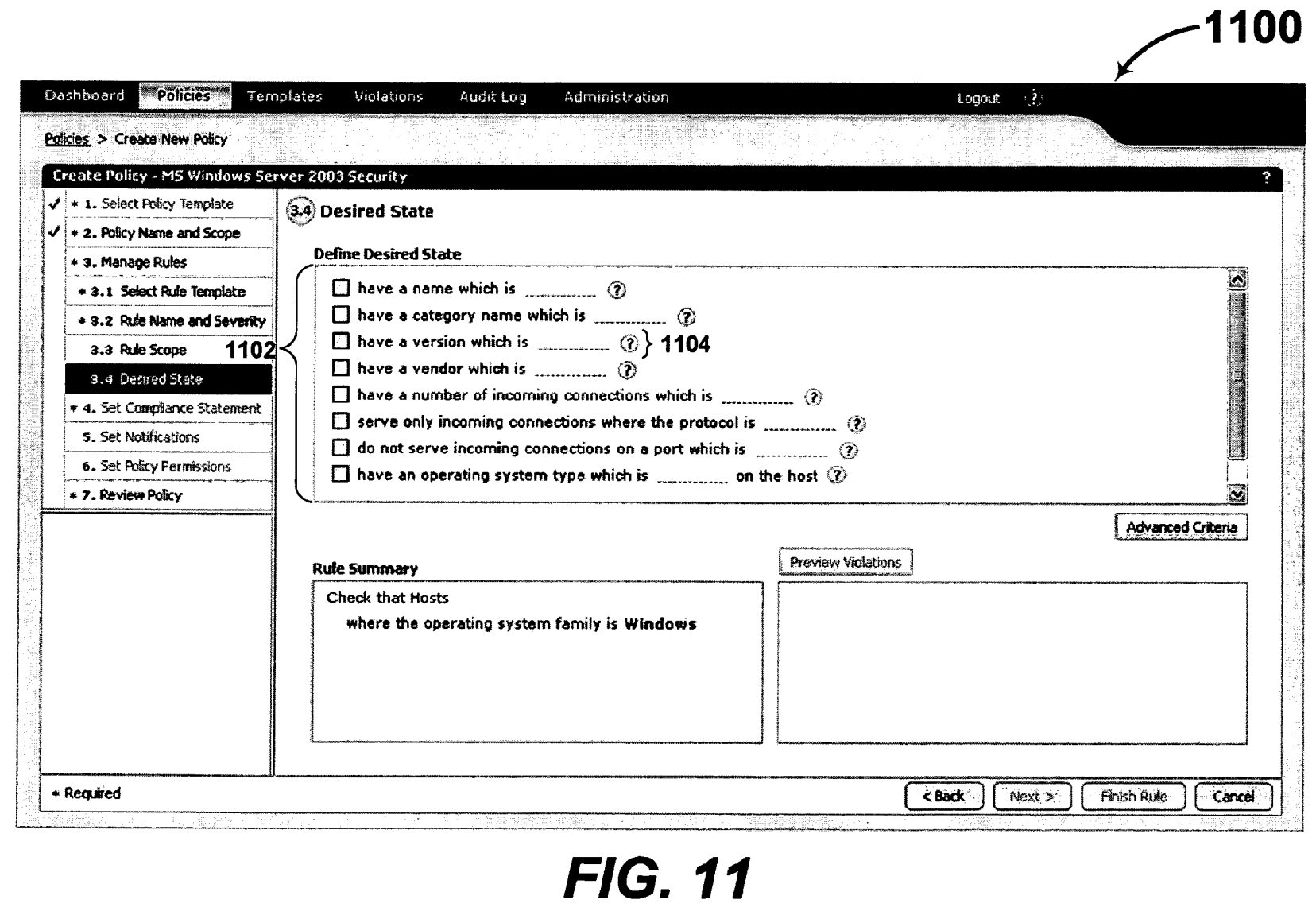

FIG. 11 is a screenshot 1100 illustrating an example graphical user interface enabling creation of a desired state definition in accordance with embodiments disclosed herein. A desired state includes at least one compliance condition that must be satisfied for a checked configuration item to be in compliance. To enable the user 108 to define a desired state, the compliance manager 140 provides a "Define Desired State" menu 1102. The "Define Desired State" menu 1102 presents a list of compliance conditions. The user 108 may select one or more compliance conditions to define a desired state. To facilitate selection of one or more compliance conditions, the compliance manager 140 displays a check box associated with each compliance condition. Similar to the selection of rule scope attributes, the compliance manager 140 can associate a query fragment with each selectable compliance condition. The user 108 can select a compliance condition by clicking on the check box associated with the compliance condition to be selected.

Figure 12:
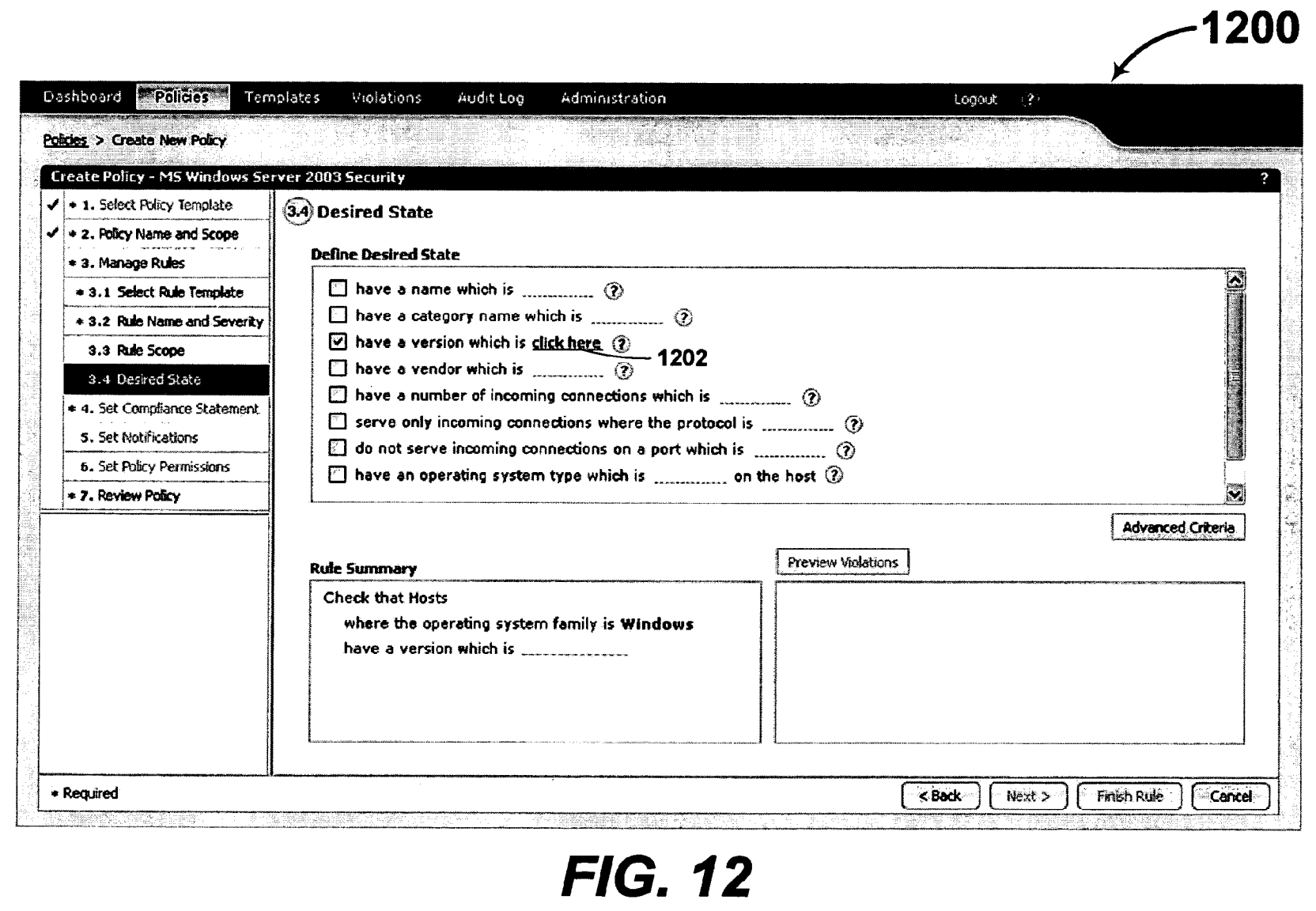

FIG. 12 is a screenshot 1200 illustrating an example graphical user interface enabling creation of a desired state definition in accordance with embodiments disclosed herein. The compliance manager 140 can display the screenshot 1200 in response to receiving input that indicates the user 108 has selected a particular compliance condition 1104 shown in screenshot 1100. That is, screenshot 1200 shows that the user 108 has selected a compliance condition 1104 requiring the selected operating system to be a particular version. By clicking on the "click here" option 1202, the user 108 can specify the required version.

Figure 13:
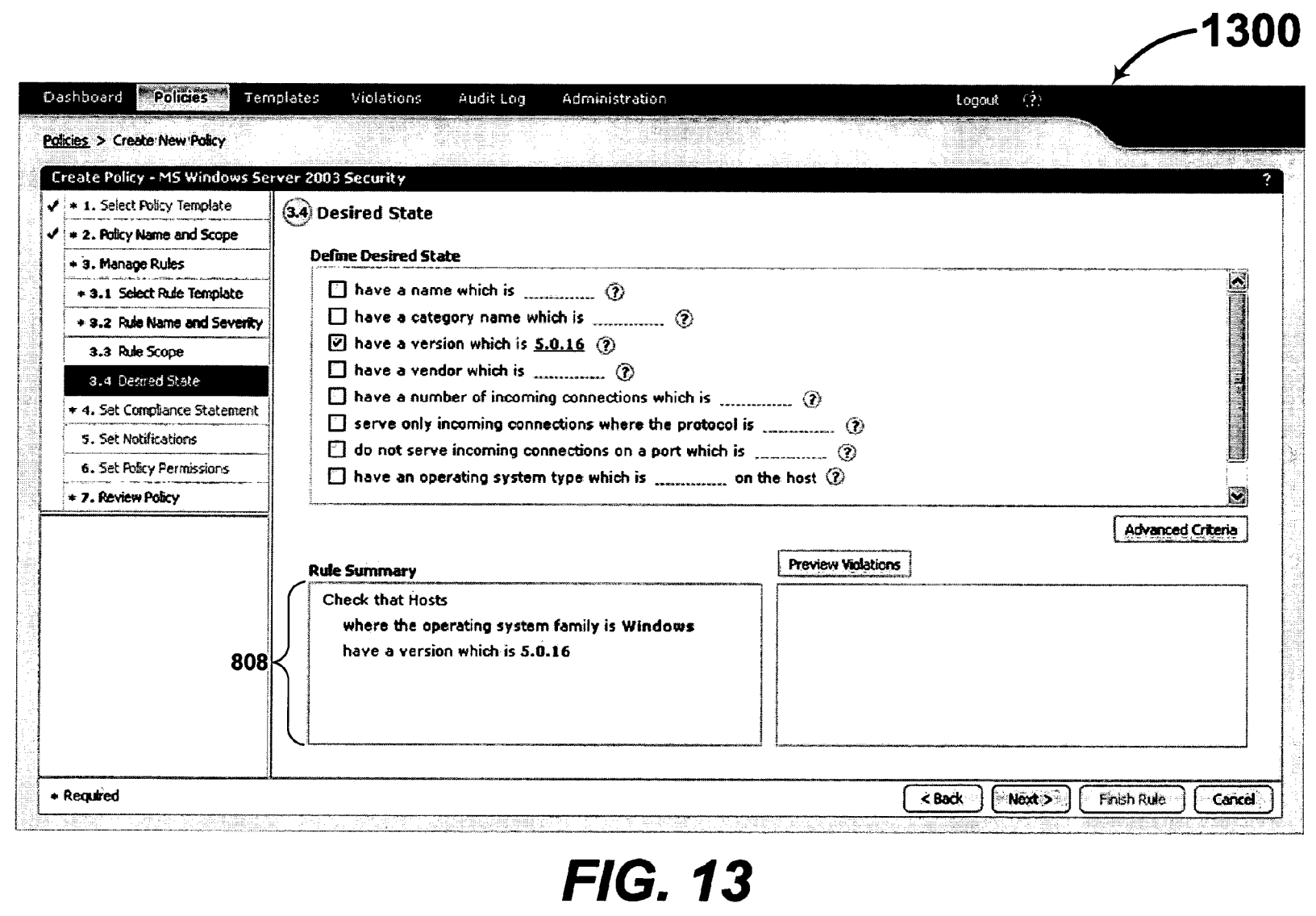

FIG. 13 is a screenshot 1300 illustrating an example graphical user interface enabling creation of a desired state definition in accordance with embodiments disclosed herein. The compliance manager 140 can display the screenshot 1300 in response to receiving input indicating that the user 108 has specified a version that is "5.0.16." The compliance manager 140 displays a summary of the rule in the "Rule Summary" region 808.

The compliance manager 140 maintains query fragments associated with each configuration-item type, maintains query fragments associated with each rule scope attribute, and maintains query fragments associated with compliance conditions. The maintained query fragments may be written in Structured Query Language ("SQL") or may be written in other query languages. As the compliance manager 140 receives input identifying a rule definition (i.e., configuration-item type, scope of the rule, and desired state) as herein described, the compliance manager 140 accumulates the query fragments associated with the rule definition.

In accordance with embodiments disclosed herein, the compliance manager 140 merges accumulated query fragments into a query for applying the compliance rule to data corresponding to the IT infrastructure 190. In particular embodiments, the compliance manager 140 does not merge the accumulated query fragments until all the query fragments have been accumulated. That is, the compliance manager 140 merges all accumulated query fragments after the rule definition is complete. However, in other embodiments, the compliance manager 140 may incrementally merge the query fragments as the compliance manager 140 receives input defining the rule. That is, each time the compliance manager 140 receives input selecting a part (e.g., configuration-item type, rule scope attribute(s), or compliance conditions), the query fragment associated with the part is merged into a query.

FIG. 14 illustrates an example script 1400 for evaluating a compliance rule in accordance with embodiments disclosed herein. The scope-constraint line 1402 corresponds to the defined rule scope illustrated by the screenshot 1000 shown in FIG. 10. The scope_constraint is true (i.e., is satisfied) for all configuration items that are hosts and have an operating system with a family attribute equal to "Windows." The compliance manager 140 can merge query fragments to form the scope-constraint expression 1404 (i.e., "(host.operating_system.family='Windows')") after all inputs have been received up to the time screenshot 1000 is displayed. Alternately, the compliance manager 140 may merge a query fragment associated with the scope attribute 806 after the scope attribute 806 is selected by the user 108. For example, this merge may result in a scope-constraint expression such as "(host.operating_system.family)". This scope-constraint expression would represent the rule scope as it is defined in the screenshot 900 shown in FIG. 9. Once the compliance manager 140 receives input indicating the user 108 has selected the operating system family, the compliance manager 140 merges the query fragment associated with the selection of the operating system to produce the scope-constraint 1404 shown in FIG. 14.

The compliance-conditions lines 1406 define the desired state of the compliance rule applied by the script 1400. In this example, the desired state is that the hosts being checked for compliance have a disk labeled "c" that has a capacity greater than 100. Thus, the attribute expression 1408 determines an attribute to be checked. And the compliance condition is that the attribute (i.e., the capacity of the "c" disk on a host) must be greater than 100. The query 1410 checks for violations of the compliance rule. A host is in violation of a compliance rule when the scope constraints are met (i.e., scope_constraint is true) and not all the compliance conditions are met (i.e., !all_conditions is true) where ! is a "not" operator. Once the query is executed, the compliance manager 140 can retrieve results of the query using the lines 1412 shown in FIG. 14.

In particular embodiments, the compliance manager 140 may query the CMDB 180 directly with the query produced by merging accumulated query fragments. However, in other embodiments, the compliance manager 140 may translate the produced query into a query expressed in a different query language. For example, the CMDB 180 may have an SQL API and the compliance manager 140 may need to translate the produced query into an SQL query before the query can be executed against the CMDB 180.

FIG. 15 illustrates an example script 1502 translated into SQL text 1504 in accordance with embodiments disclosed herein. The example script 1502 includes a query 1506 produced my merging query fragments in accordance with embodiments disclosed herein. The SQL text 1504 represents an SQL query that can be executed to query a CMDB 180 that includes a SQL API.

Figure 16:
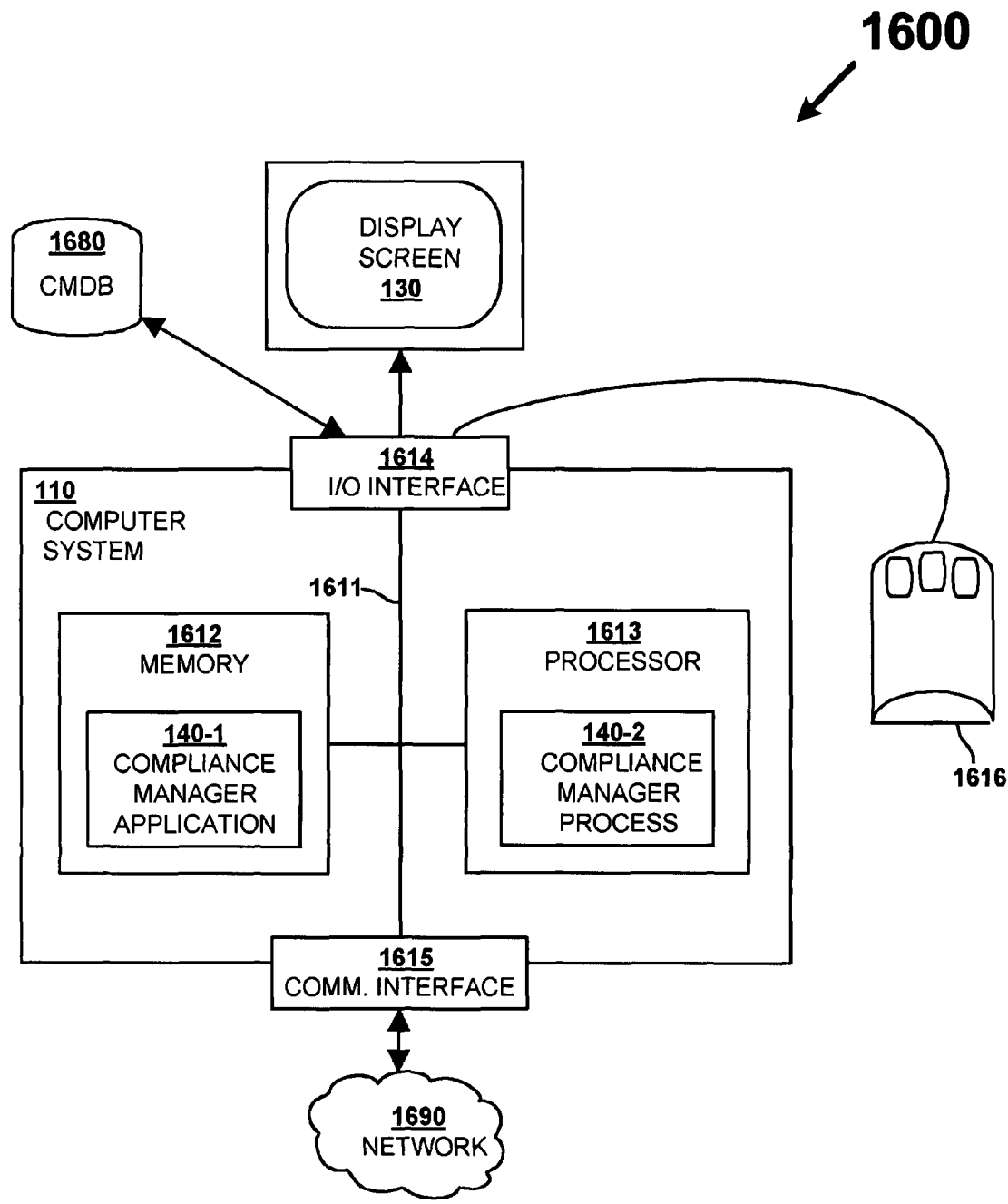
FIG. 16 is a block diagram of an example processing device suitable for executing a respective compliance manager in accordance with embodiments disclosed herein.

FIG. 16 is a block diagram 1600 illustrating an example computer system 110 for executing compliance manager 140 and related functions/processes in accordance with embodiments disclosed herein. Computer system 110 may be a computerized device such as a personal computer, workstation, portable computing device, console, network terminal, processing device, etc.

As shown, computer system 110 of the present example includes an interconnect 1611 that couples a memory system 1612, a processor 1613, an I/O interface 1614, and a communications interface 1615. I/O interface 1614 enables computer system 110 to access the CMDB 180 and display a graphical user interface on display screen 130. Communications interface 1615 of computer system 110 enables computer system 110 to communicate over network 1690 to transmit and receive information from different resources.

As shown, memory system 1612 is encoded with compliance manager application 140-1 supporting generation of graphical user interface and other functions in accordance with embodiments disclosed herein. Compliance manager application 140-1 can be embodied as software code such as data and/or logic instructions (e.g., code stored in the memory 1612 or on another computer-readable medium such as a disk) that support functionality according to different embodiments described herein.

During operation of compliance manager application 140-1, processor 1613 accesses memory system 1612 via the interconnect 1611 in order to launch, run, execute, interpret or otherwise perform the logic instructions of the compliance manager application 140-1. Execution of the compliance manager application 140-1 produces processing functionality in compliance manager process 140-2. In other words, the compliance manager process 140-2 represents one or more portions of the compliance manager application 140-1 (or the entire application) performing within or upon the processor 1613 in the computer system 110.

It should be noted that compliance manager process 140-2 (also in FIG. 1) executed in computer system 110 can be represented by either one or both of the compliance manager application 140-1 and/or the compliance manager process 140-2. For purposes of the present disclosure and different embodiments herein, general reference will again be made to the compliance manager process 140-2 as performing or supporting the various steps and functional operations as previously discussed and as may be discussed further in this specification.

As mentioned, in addition to the compliance manager process 140-2, embodiments herein include the compliance manager application 140-1 itself (i.e., the un-executed or non-performing logic instructions and/or data). The compliance manager application 140-1 may be stored on a computer-readable medium such as a floppy disk, hard disk, or optical medium. The compliance manager application 140-1 may also be stored in a memory type system such as in firmware, read only memory (ROM), or, as in this example, as executable code within the memory system 1612 (e.g., within Random Access Memory or RAM). In addition to these embodiments, it should also be noted that other embodiments herein include the execution of compliance manager application 140-1 in processor 1613 as the compliance manager process 140-2. Thus, those skilled in the art will understand that the computer system 110 may include other processes and/or software and hardware components, such as an operating system that controls allocation and use of hardware resources.

FIG. 17 illustrates procedures 1700 performable by a compliance manager in accordance with embodiments disclosed herein. In step 1710, the compliance manager receives input defining a compliance rule. The input includes input identifying a configuration-item type, input defining a scope of the compliance rule, and input defining a desired state for each of the configuration items to be checked by the compliance rule. The identified configuration-item type determines a type of configuration item in an IT infrastructure of different types of configuration items. One example of such an IT infrastructure is an IT infrastructure for a storage area network. In particular embodiments, the identified configuration-item type will be hosts, services, or connections. Thus, in particular embodiments, an IT infrastructure (e.g., for a storage area network) can be modeled by an object model wherein the objects (i.e., the configuration items) are one of three types. The defined rule scope determines which configuration items of the identified type are to be checked by the compliance rule for compliance. The defined desired state includes at least one compliance condition that must be satisfied for a checked configuration item to be in compliance.

In step 1720, the compliance manager accumulates query fragments associated with the defined rule scope. In step 1730, the compliance manager accumulates query fragments associated with the defined desired state.

In step 1740, the compliance manager merges the accumulated query fragments into a query for applying the compliance rule to data corresponding to the IT infrastructure. In particular embodiments the query is expressed as an SQL query. In particular embodiments, the compliance manager executes the query to apply the defined rule to data corresponding to the IT infrastructure to determine compliance of the IT infrastructure.

In accordance with embodiments of inventive matter disclosed herein, compliance rules for checking compliance of IT infrastructures can be easily created. While inventive matter has been shown and described herein with reference to specific embodiments thereof, it should be understood by those skilled in the art that variations, alterations, changes in form and detail, and equivalents may be made or conceived of without departing from the spirit and scope of the invention.

Accordingly, the scope of the present invention should be assessed as that of the appended claims and by equivalents thereof.

What is claimed is:

1. A method for processing compliance rules in an application for checking compliance of an IT infrastructure, the method comprising:
    receiving input defining a compliance rule, the input including:
        i) input identifying a configuration-item type, the identified configuration-item type determining a type of configuration item in the IT infrastructure of different types of configuration items;
        ii) input defining a scope of the compliance rule, the scope determining which configuration items of the identified type are to be checked by the rule for compliance; and
        iii) input defining a desired state for each of the configuration items to be checked by the compliance rule, the desired state including at least one compliance condition that must be satisfied for a checked configuration item to be in compliance;
    accumulating query fragments associated with the scope of the compliance rule;
    accumulating query fragments associated with the desired state; and
    merging the accumulated query fragments into a query for applying the compliance rule to data corresponding to the IT infrastructure;
    initiating display of a graphical user interface;
    based on first input to the graphical user interface, receiving a first query fragment indicating a first selected type of resource in the IT infrastructure;
    based on second input to the graphical user interface, receiving a second query fragment indicating a second selected type of resource in the IT infrastructure;
    wherein merging the accumulated query fragments comprises combining the first query fragment and the second query fragment into an expression to specify which resources of the first selected type in the IT infrastructure is to be checked for compliance using the compliance rule;
    initiating display of first preview scope information in the graphical user interface, the first preview scope information indicating a number of how many resources are of the first selected type;
    initiating display of second preview scope information in the graphical user interface, the second preview scope information indicating a number of how many resources of the first selected type include a resource of a type as specified by the second selected type;
    based on third input to the graphical user interface, receiving state information specifying a required attribute that is to be associated with the second selected type of resource in the IT infrastructure; and
    creating a rule query to include a scope constraint expression and an attribute expression, the scope constraint expression specified by a combination of the first fragment and the second fragment, the attribute expression being based on the state information.

2. The method of claim 1, wherein merging the accumulated query fragments into a query comprises:
    merging the accumulated query fragments into a query expressed as a structured-query-language query.

3. The method of claim 1, comprising:
executing the query to apply the compliance rule to data corresponding to the IT infrastructure to determine compliance of the network.

4. The method of claim 1, wherein the scope of the compliance rule comprises at least one conditional expression with configuration items satisfying the at least one conditional expression being considered as within the scope of the compliance rule.

5. The method of claim 4, wherein each conditional expression corresponds to an accumulated query fragment associated with the scope of the compliance rule.

6. The method of claim 1, wherein each compliance condition corresponds to an accumulated query fragment associated with the desired state.

7. The method of claim 1, wherein the identified configuration-item type is one of hosts, services, or connections.

8. The method as in claim 1 further comprising:
as specified by scope constraint expression in the rule query, applying the compliance rule to particular resources in the IT infrastructure of the first selected type having the selected second type of resource to verify whether each of the particular resources have the selected second type of resource as specified by the required attribute.

9. An apparatus comprising:
a processor;
a memory unit that stores instructions associated with an application executable by the processor; and
an interconnect coupling the processor and the memory unit, enabling the computer system to execute the application and perform operations of:
receiving input defining a compliance rule, the input including:
i) input identifying a configuration-item type, the identified configuration-item type determining a type of configuration item in the IT infrastructure of different types of configuration items;
ii) input defining a scope of the compliance rule, the scope determining which configuration items of the identified type are to be checked by the rule for compliance; and
iii) input defining a desired state for each of the configuration items to be checked by the compliance rule, the desired state including at least one compliance condition that must be satisfied for a checked configuration item to be in compliance;
accumulating query fragments associated with the scope of the compliance rule;
accumulating query fragments associated with the desired state; and
merging the accumulated query fragments into a query for applying the compliance rule to data corresponding to the IT infrastructure;
initiating display of a graphical user interface;
based on first input to the graphical user interface, receiving a first query fragment indicating a first selected type of resource in the IT infrastructure;
based on second input to the graphical user interface, receiving a second query fragment indicating a second selected type of resource in the IT infrastructure;
wherein merging the accumulated query fragments comprises combining the first query fragment and the second query fragment into an expression to specify which resources of the first selected type in the IT infrastructure is to be checked for compliance using the compliance rule;
initiating display of first preview scope information in the graphical user interface, the first preview scope information indicating a number of how many resources are of the first selected type;
initiating display of second preview scope information in the graphical user interface, the second preview scope information indicating a number of how many resources of the first selected type include a resource of a type as specified by the second selected type;
based on third input to the graphical user interface, receiving state information specifying a required attribute that is to be associated with the second selected type of resource in the IT infrastructure; and
creating a rule query to include a scope constraint expression and an attribute expression, the scope constraint expression specified by a combination of the first fragment and the second fragment, the attribute expression being based on the state information.

10. The apparatus of claim 9, wherein merging the accumulated query fragments into an executable query comprises:
merging the accumulated query fragments into a query expressed as a structured-query-language query.

11. The apparatus of claim 9, comprising:
executing the query to apply the rule to data corresponding to the IT infrastructure to determine compliance of the IT infrastructure.

12. The apparatus of claim 9, wherein the scope of the compliance rule comprises at least one conditional expression with configuration items satisfying the at least one conditional expression being considered as within the scope of the compliance rule.

13. The apparatus of claim 12, wherein each conditional expression corresponds to an accumulated query fragment associated with the scope of the compliance rule.

14. The apparatus of claim 9, wherein each compliance condition corresponds to an accumulated query fragment associated with the desired state.

15. The apparatus of claim 9, wherein the identified configuration-item type is one of hosts, services, or connections.

16. Software encoded in one or more hardware computer-readable storage media for execution and, when executed, operable to perform steps of:
receiving input defining a compliance rule, the input including:
i) input identifying a configuration-item type, the identified configuration-item type determining a type of configuration item in the IT infrastructure of different types of configuration items;
ii) input defining a scope of the compliance rule, the scope determining which configuration items of the identified type are to be checked by the rule for compliance; and
iii) input defining a desired state for each of the configuration items to be checked by the compliance rule, the desired state including at least one compliance condition that must be satisfied for a checked configuration item to be in compliance;
accumulating query fragments associated with the scope of the compliance rule;
accumulating query fragments associated with the desired state; and
merging the accumulated query fragments into a query for applying the compliance rule to data corresponding to the IT infrastructure;
initiating display of a graphical user interface;

based on first input to the graphical user interface, receiving a first query fragment indicating a first selected type of resource in the IT infrastructure;

based on second input to the graphical user interface, receiving a second query fragment indicating a second selected type of resource in the IT infrastructure;

wherein merging the accumulated query fragments comprises combining the first query fragment and the second query fragment into an expression to specify which resources of the first selected type in the IT infrastructure is to be checked for compliance using the compliance rule;

initiating display of first preview scope information in the graphical user interface, the first preview scope information indicating a number of how many resources are of the first selected type;

initiating display of second preview scope information in the graphical user interface, the second preview scope information indicating a number of how many resources of the first selected type include a resource of a type as specified by the second selected type;

based on third input to the graphical user interface, receiving state information specifying a required attribute that is to be associated with the second selected type of resource in the IT infrastructure; and creating a rule query to include a scope constraint expression and an attribute expression, the scope constraint expression specified by a combination of the first fragment and the second fragment, the attribute expression being based on the state information.

17. The software of claim 16, wherein merging the accumulated query fragments into a query comprises:

merging the accumulated query fragments into a query expressed as a structured-query-language query.

* * * * *